US010453125B2

(12) United States Patent
Caldwell

(10) Patent No.: US 10,453,125 B2
(45) Date of Patent: Oct. 22, 2019

(54) TRANSACTION-BASED DEBT MANAGEMENT AND VISUALIZATION

(71) Applicant: MX Technologies, Inc., Lehi, UT (US)

(72) Inventor: John Ryan Caldwell, Lehi, UT (US)

(73) Assignee: MX TECHNOLOGIES, INC., Lehi, UT (US)

(*) Notice: Subject to any disclaimer, the term of this patent is extended or adjusted under 35 U.S.C. 154(b) by 633 days.

(21) Appl. No.: 14/977,629

(22) Filed: Dec. 21, 2015

(65) Prior Publication Data
US 2016/0180452 A1 Jun. 23, 2016

Related U.S. Application Data

(60) Provisional application No. 62/094,925, filed on Dec. 19, 2014.

(51) Int. Cl.
G06Q 40/00 (2012.01)
G06Q 20/32 (2012.01)
G06Q 20/20 (2012.01)
G06Q 20/22 (2012.01)

(52) U.S. Cl.
CPC .......... *G06Q 40/00* (2013.01); *G06Q 20/202* (2013.01); *G06Q 20/227* (2013.01); *G06Q 20/3223* (2013.01)

(58) Field of Classification Search
CPC .... G06Q 40/00; G06Q 20/202; G06Q 20/227; G06Q 20/3223
USPC ..... 705/21, 17, 35, 39, 7.26, 7.38, 36 R, 40, 705/44
See application file for complete search history.

(56) References Cited

U.S. PATENT DOCUMENTS

| 8,712,887 | B2* | 4/2014 | DeGroeve | G06Q 20/10 |
| | | | | 705/35 |
| 2007/0043659 | A1* | 2/2007 | Kass | G06Q 30/02 |
| | | | | 705/38 |
| 2007/0146005 | A1* | 6/2007 | Sauber | G06F 17/5045 |
| | | | | 326/37 |
| 2007/0156554 | A1* | 7/2007 | Nikoley | G06Q 40/00 |
| | | | | 705/35 |
| 2009/0030819 | A1* | 1/2009 | VanLeeuwen | G06Q 40/00 |
| | | | | 705/30 |
| 2009/0248481 | A1* | 10/2009 | Dick | G06Q 10/06316 |
| | | | | 705/7.26 |
| 2013/0024364 | A1* | 1/2013 | Shrivastava | G06Q 20/38 |
| | | | | 705/39 |

(Continued)

*Primary Examiner* — Vanel Frenel
(74) *Attorney, Agent, or Firm* — Kunzler Bean & Adamson, PC

(57) ABSTRACT

Apparatuses, systems, methods, and program products are disclosed for transaction-based debt management and visualization. A method includes receiving debt data for one or more debt accounts of a user over a data network at a mobile device. A method includes generating a graphical representation of debt data based on one or more characteristics of the debt data determined for a period of time related to the debt data. A method includes presenting a graphical representation of debt data within an interface of a display device of a mobile device. A method includes dynamically adjusting a graphical representation of debt data with a new period of time related to the debt data in response to a user selecting one of a plurality of debt plans for reducing a balance in the one or more of the user's debt accounts.

17 Claims, 8 Drawing Sheets

(56) References Cited

U.S. PATENT DOCUMENTS

| | | | | |
|---|---|---|---|---|
| 2014/0136381 A1* | 5/2014 | Joseph | ................... | G06Q 40/02 |
| | | | | 705/35 |
| 2015/0324783 A1* | 11/2015 | Desai | ................... | G06Q 20/322 |
| | | | | 705/39 |
| 2015/0379488 A1* | 12/2015 | Ruff | ..................... | G06Q 20/108 |
| | | | | 705/36 R |

* cited by examiner ered by reference.

TRANSACTION-BASED DEBT MANAGEMENT AND VISUALIZATION

CROSS-REFERENCES TO RELATED APPLICATIONS

This application claims the benefit of U.S. Provisional Patent Application No. 62/094,925 entitled "DEBT IMPROVEMENT VISUALIZATION AND COMPARATOR" and filed on Dec. 19, 2014, for John Ryan Caldwell, which is incorporated herein by reference.

FIELD

This invention relates to debt management and more particularly relates to transaction-based debt management and visualization.

BACKGROUND

Debt repayment is something that most modern individuals may encounter with various institutions. Due in large part to advances in computing technologies, debt transactional data, in its many forms, can be tracked and used to provide meaningful feedback to users regarding repayment. For example, it may be helpful to visualize a user's debt payoff schedule in a graphical form that allows a user to view his/her debt payoff trends over time. Furthermore, it may be useful to utilize a user's debt data and repayment trends to guide a user on future debt transactions.

SUMMARY

Apparatuses for transaction-based debt management and visualization are disclosed. Systems and methods also perform certain functions of the apparatuses. In one embodiment, an apparatus includes a display device and a semiconductor integrated circuit device. A semiconductor integrated circuit device, in one embodiment, includes one or more pins configured to receive debt data for one or more debt accounts of a user. In a further embodiment, a semiconductor integrated circuit device includes one or more hardware circuits configured to calculate one or more characteristics of debt data. One or more characteristics of debt data may be calculated for a period of time related to the debt data. In some embodiments, a semiconductor integrated circuit device includes one or more hardware circuits configured to generate a graphical representation of debt data using one or more calculated characteristics of the debt data and one or more hardware circuits configured to present the graphical representation of the debt data within an interface on a display device.

An apparatus, in a further embodiment, includes a mobile device and/or one or more sensors electrically coupled to the mobile device. A mobile device, in certain embodiments, includes a graph module that generates a graphical representation of debt data associated with a user. Debt data may comprise an aggregation of debt data across a plurality of debt accounts of a user. In one embodiment, a mobile device includes a planning module that creates one or more debt plans for reducing a balance of each of a plurality of debt accounts over time. In a further embodiment, a mobile device includes a display module that presents a graphical representation of debt data and one or more debt plans on a display of the mobile device. A graphical representation of debt data may be presented according to a debt plan selected by a user.

In certain embodiments, a mobile device includes a payment module that detects initiation of a mobile payment on the mobile device. A mobile payment may be initiated using one or more sensors of a mobile device. One or more sensors of a mobile device may be in wireless communication with one or more sensors of a point of sale device and may be configured to process a mobile payment by wirelessly transmitting payment information from the mobile device to the point of sale device. In one embodiment, a payment module refuses processing a mobile payment from at least one of a plurality of debt accounts of a user on a mobile device in response to an amount of the mobile payment increasing a debt amount of the at least one of the plurality of debt accounts beyond a user's selected debt plan.

A method, in one embodiment, includes receiving debt data for one or more debt accounts of a user over a data network at a mobile device. In a further embodiment, a method includes generating a graphical representation of debt data within an interface of a display device of a mobile device. In one embodiment, a display device includes a touch screen display and a graphical representation of debt data is interactive on the touch screen display. A method, in certain embodiments, includes dynamically adjusting a graphical representation of debt data with a new period of time related to the debt data in response to a user selecting one of a plurality of debt plans for reducing a balance in one or more of a user's debt accounts, using a touch screen display.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
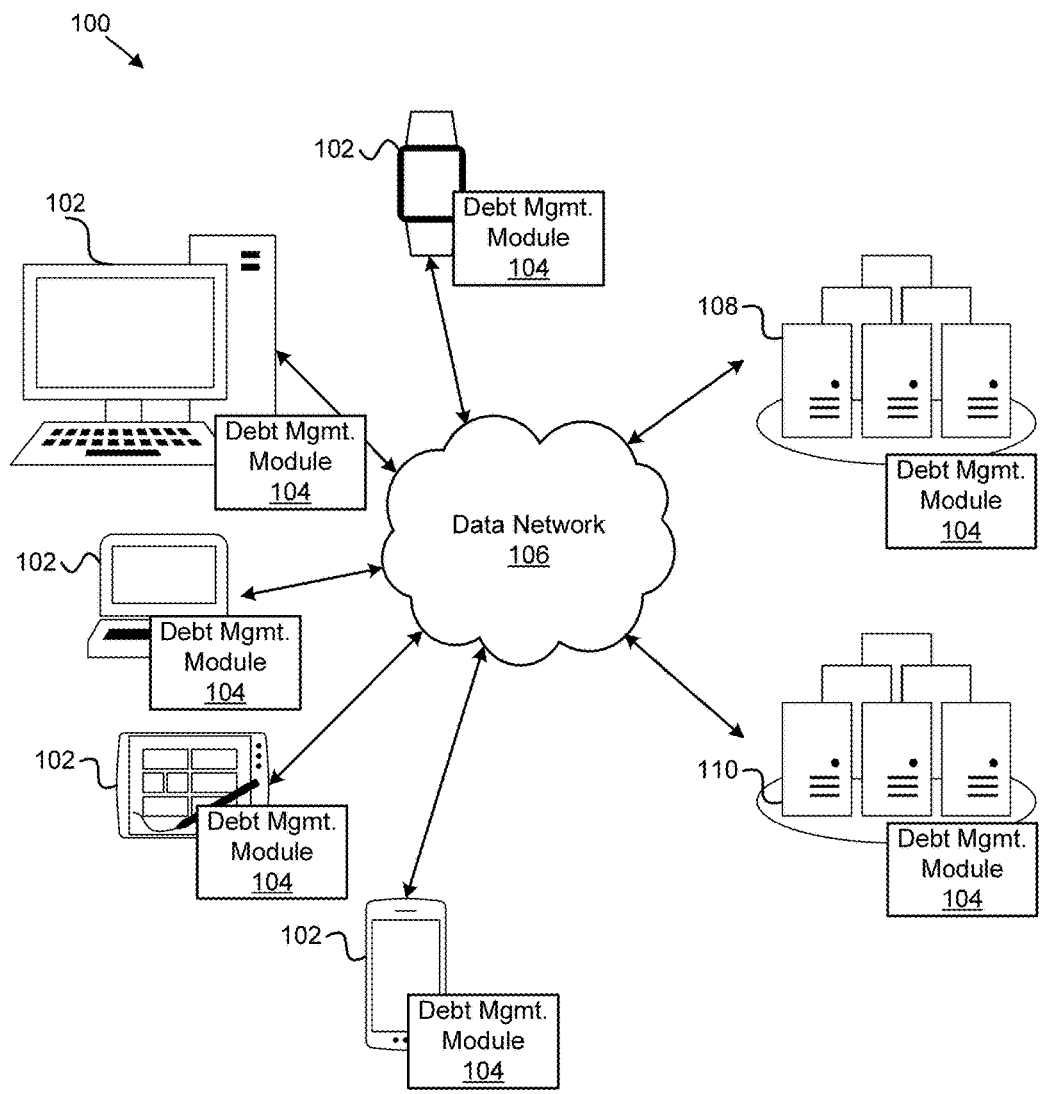
FIG. 1A is a schematic block diagram illustrating one embodiment of a system for transaction-based debt management and visualization.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The subject matter herein relates generally to providing feedback to users of a computing environment regarding the progress in managing debts, and relates more particularly, but not necessarily entirely, to a system for providing a historical basis for providing context for projected payoff goals and using debt data in the processing of future debt transactions.

It may be very similar to the same psychology behind weight loss. If the user knows that the user lost 10 pounds last week then the user is excited about the loss and the user is making progress. Then again, the reverse action may have the same effect. If the user knows the user gained 20 pounds last week, then the user can create a strategy to get the weight gain under control. So, whether the information is bad or good behind this historical line, it is a motivator to help that person to give context and care.

Otherwise, without the historical data, every time they log in to a progress goal chart, the chart essentially looks the same. One implementation of the disclosed subject matter may include a feature that shows previous time periods in order to provide context of how a user is actually doing in regards to paying off their debts. In some implementations, a user may click a button and it may show the user's debt history over the previous 6 months, 9 months, 12 months or whatever time period is desired. Such a feature may allow a user to view their debt account trends to see if they are making progress towards paying off their debts.

In one embodiment, a graphical interface may shrink down to show the past debt payment efforts. For example, if the history of debts was very high and now the user is down to the last $5,000 of $100,000 in debts, the user can feel good about the progress. Just by clicking this history button, it shows the user all the great progress that the user has made.

Again, comparing finance to weight loss, it is like the user can see that the user used to weigh 500 pounds, but has lost 200 pounds over a period of time, and the user may be close to his/her weight loss goal, which may provide additional motivation for losing weight. The same analogy may apply to finances to show the debt payoff trends over a period of time so that the user can visualize whether they are on track to pay down their debts. Again, the historical debt data may be helpful for the user to see how much the user has progressed in paying off their debts.

Accordingly, a graphical chart or graph may become much more useful by allowing people to be motivated by prior behavior. So, in certain embodiments, it is the process of being able to show in the interface the history of where the debts have been and then show the user integrated into the history of where the users have been, what the debt payoff could be if the user continued to pay a certain amount or paid a varied amount, and/or the like.

Furthermore, in one embodiment, the debt data may be used as a guide, baseline, or the like for one or more debt payment plans, financial budgets, financial goals, and/or the like, which may be used to assist the user in future debt transactions and purchases.

FIG. 1A depicts an embodiment of a system 100 for transaction-based debt management and visualization. In one embodiment, the system 100 includes one or more information handling devices 102, one or more debt management modules 104, one or more data networks 106, one or more financial institution systems 108, and/or one or more aggregator systems 110. In certain embodiments, even though a specific number of information handling devices 102, debt management modules 104, data networks 106, financial institution systems 108, and aggregator systems 110 are depicted in FIG. 1A, one of skill in the art will recognize, in light of this disclosure, that any number of information handling devices 102, debt management modules 104, data networks 106, financial institution systems 108, and aggregator systems 110 may be included in the system 100 for transaction-based debt management and visualization.

In one embodiment, the system 100 includes one or more information handling devices 102. The information handing devices 102 may include one or more of a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the information handling devices 102 are communicatively coupled to a financial institution system 108 and/or an aggregator system 110 via a data network 106, described below. The information handling devices 102, in a further embodiment, are capable of executing various programs, program code, applications, instructions, functions, or the like. The information handling devices 102 may include one or more sensors, such as proximity sensors, near-field communication sensors, Bluetooth® sensors, infrared sensors, magnetic transmission sensors, and/or the like.

The debt management module 104, in certain embodiments, leverages a user's debt information derived from a user's financial information, which may be aggregated across multiple financial accounts held by the user, to provide debt management tools to the user, such as debt visualization tools, debt pay-down or pay-off planning, and/or the like. In one embodiment, the debt management module 104 is configured to receive financial data for a user over a data network 106 from one or more financial institutions where the user has a user account. The financial data may include debt data for one or more debt accounts of the user. In a further embodiment, the debt management module 104 is configured to calculate one or more characteristics of the debt data for a period of time related to the debt data. In some embodiments, the debt management module 104 is configured to generate a graphical representation of the debt data using the calculated one or more characteristics of the debt data and present the graphical representation of the debt data within an interface on the display device.

In some embodiments, the debt management module 104 is configured to detect initiation of a mobile payment on a mobile device using the one or more sensors of the mobile device. In one embodiment, the one or more sensors of the mobile device in wireless communication with one or more sensors of a point of sale device and configured to process a mobile payment by wirelessly transmitting payment information from the mobile device to the point of sale device. The debt management module 104, in various embodiments, is configured to refuse processing of the mobile payment on the mobile device in response to an amount of the mobile payment increasing an amount in a debt account beyond the user's selected debt plan. In this manner, in certain embodiments, the debt management module 104 increases the usability of a budgeting interface by incorporating a graphical representation of a user's debt burden and payoff over time. Moreover, the debt management module 104, in one embodiment, provides a mechanism to prevent the user from amassing more debt than the user has planned for during a wireless or mobile purchase.

In various embodiments, the debt management module 104 may be embodied as hardware, software, or some combination of hardware and software. In one embodiment, the debt management module 104 may comprise executable program code stored on a non-transitory computer readable storage medium for execution on a processor of an information handling device 102, a device of a financial institution system 108, an aggregator system 110, or the like. For example, the debt management module 104 may be embodied as executable program code executing on one or more of an information handling device 102, a financial institution system 108, an aggregator system 110, a combination of one or more of the foregoing, or the like. In such an embodiment, the various modules that perform the operations of the debt management module 104, as described below, may be located on an information handling device 102, a financial institution system 108, an aggregator system 110, a combination of the foregoing, and/or the like.

In various embodiments, the debt management module 104 may be embodied as a hardware appliance that can be installed or deployed in a financial institution system 108, an aggregator system 110, on a user's information handling device 102, or elsewhere on the data network 106. In certain embodiments, the debt management module 104 may comprise a hardware device such as a secure hardware dongle or other hardware appliance device (e.g., a set-top box, a network appliance, or the like) that attaches to another information handling device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like). A hardware appliance of the debt management module 104 may comprise a power interface, a wired and/or wireless network interface, a graphical interface that attaches to a display, an electronic display, and/or a semiconductor integrated circuit device as described below, configured to perform the functions described herein with regard to the debt management module 104.

The debt management module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, the debt management module 104 may be mounted on a printed circuit board with one or more electrical lines or connections (e.g., to volatile memory, a non-volatile storage medium, a network interface, a peripheral device, a graphical/display interface, and/or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the debt management module 104. The debt management module 104 may comprise a computer (e.g., a digital computer, an analog computer, a quantum computer, and/or the like) hard-wired to perform its various functions described below for transaction-based debt management and visualization.

The semiconductor integrated circuit device or other hardware appliance of the debt management module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of the debt management module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The financial institution systems 108, in one embodiment, comprise information systems for banking institutions, investment companies, credit card companies, loan servicers, and/or the like. The financial institution systems 108 may maintain and store financial data for a user such as account transactions, account balances, debt data, financial budgets, financial goals, and/or the like. The aggregator systems 110 may be communicatively coupled to the financial institution systems 108 to access the financial data for a user and aggregate the financial data across each of the user's accounts such as checking accounts, investment accounts, retirement accounts, loan accounts, debt accounts, and/or the like. A user, for example, may log in to an aggregator system 110 to view a status of each of the users' accounts located at various financial institutions in a single place, which may increase the usability and effectiveness of the system.

Figure 1B:
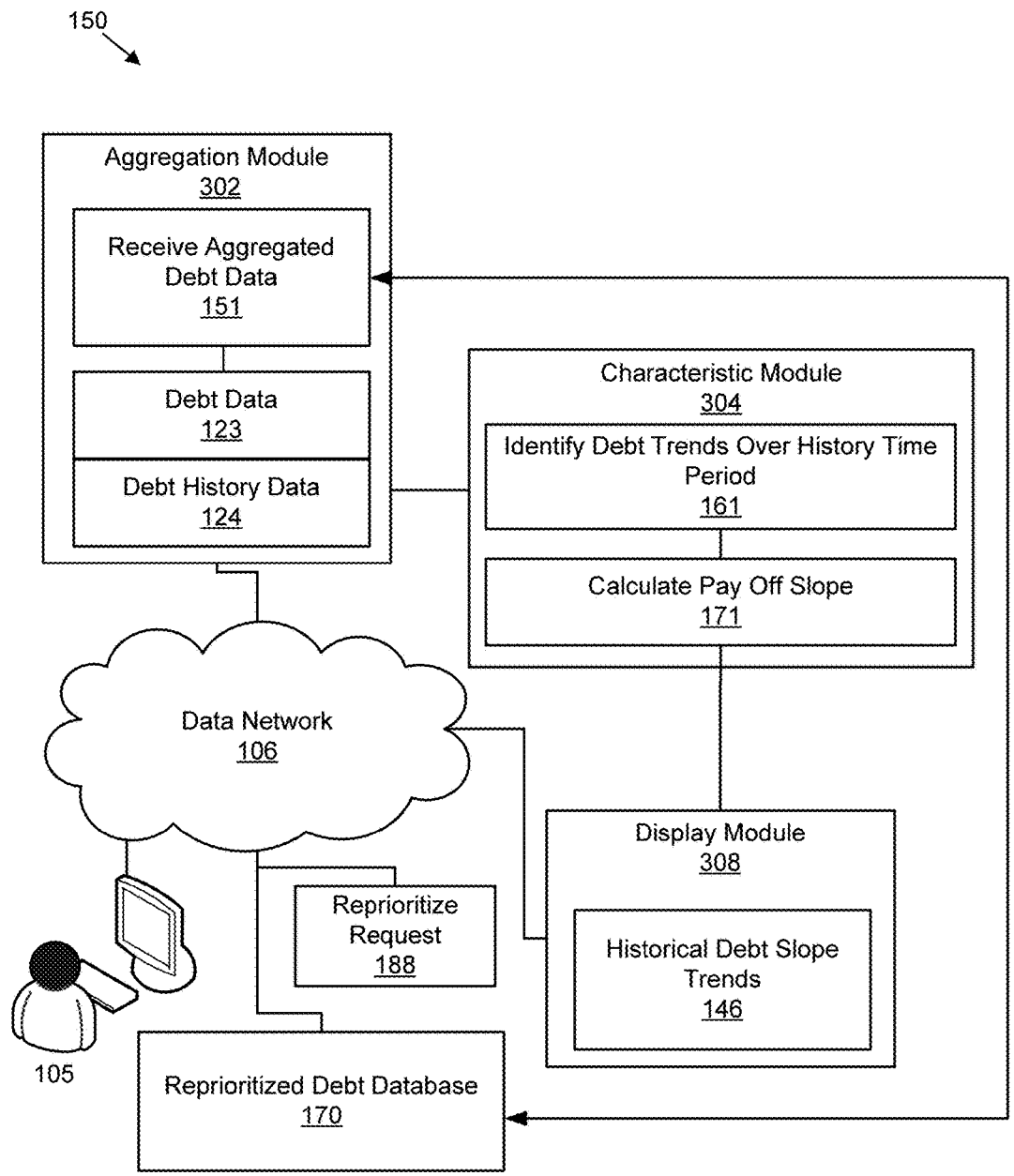
FIG. 1B is a schematic block diagram illustrating one embodiment of a system for transaction-based debt management and visualization.

FIG. 1B illustrates a system 150 that includes a computer environment and network 106 for providing debt management information from aggregated account data and services suggestions to a user. Illustrated in the figure is a user 105 that is electronically connected to financial institutions 108 through a network 106. The financial institutions 108 may comprise an aggregation module 302, described below, that may receive aggregated debt data 151 that may include current debt data 123 and historical debt data 124. The system may further comprise a characteristic module 304 that identifies historical debt data 161 and transmits the transactions for service suggestions. Additionally, the characteristic module 304 may perform calculations regarding debt pay off slope 171 and trends based on a graphical representation of the graph.

As further illustrated in the FIG. 1B, the system may comprise a display module 308 running on computer hardware over a data network 106, wherein the display module 308 may utilize a historic debt database 146 comprising debt slopes and trends available from financial institutions 108 regarding the user's debt accounts. The system may further comprise debt reprioritization database 170 wherein debts may be reprioritized during use. Additionally, as can be seen in the figure, reprioritization 188 may be requested by a user to change the nature of the debts paid off by the method.

Figure 2:
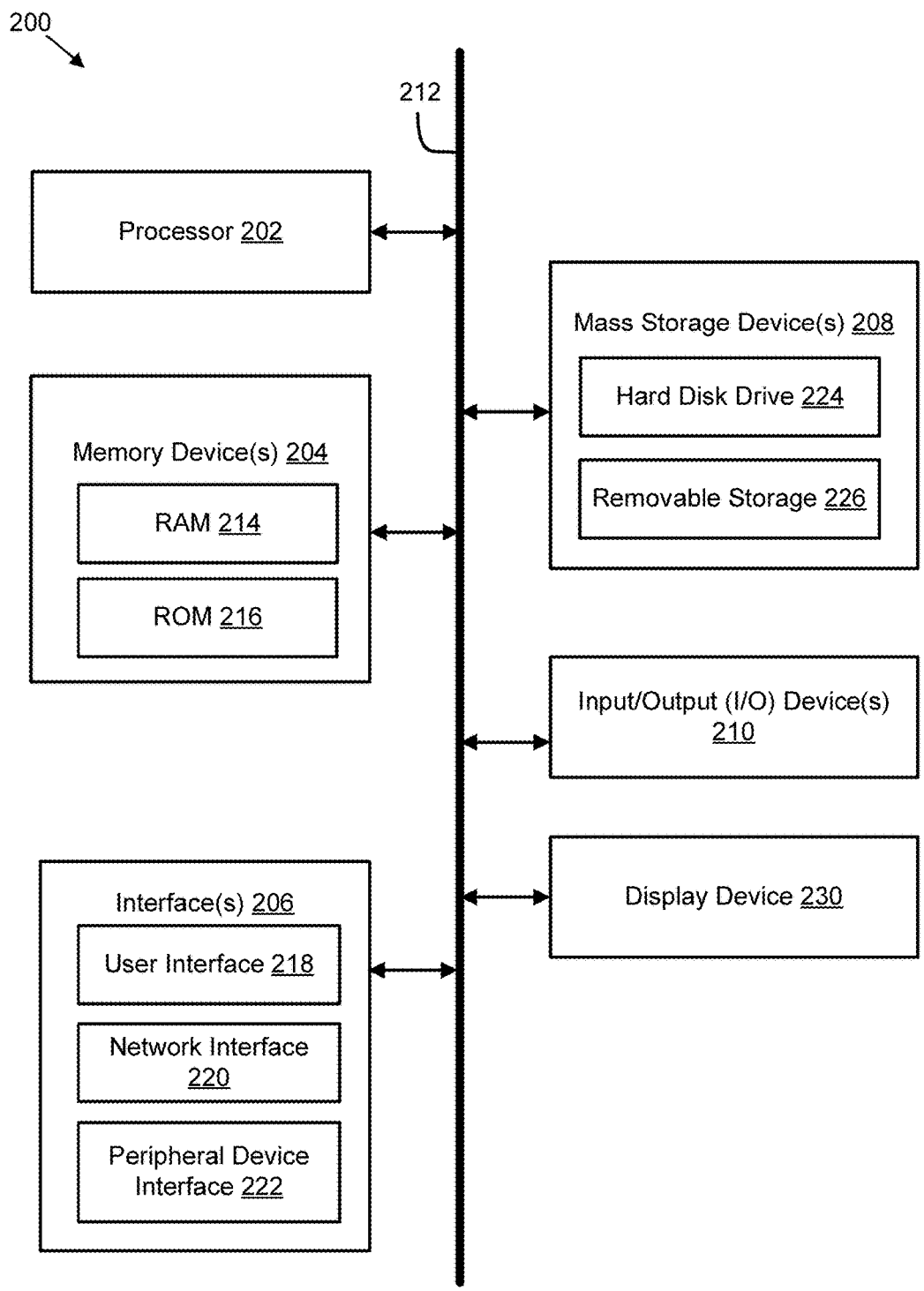
FIG. 2 is a schematic block diagram illustrating one embodiment of a system for transaction-based debt management and visualization.

FIG. 2 is a schematic representation of computing device 200 including computer hardware and protocols that enable the various embodiments discussed herein. Implementations of the present disclosure may comprise or utilize a special purpose computer, including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices), in some embodiments, includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

As described above, a data network 106, in one embodiment, is defined as one or more data links that enable the transport of electronic data between computer systems and/or modules and/or other electronic devices. In an implementation, computers may be networked in order to communicate with each other, and other components, connected over the network 106 to which they are connected. When information is transferred or provided over a network 106 or another communications connection (either hardwired, wireless, or a combination of hardwired or wireless) to a computer, the computer may properly view the connection as a transmission medium. Transmissions media may include a network 106 and/or data links, which may be used to carry desired program code means in the form of computer-executable instructions or data structures and which may be accessed by a general purpose or special purpose computer. Combinations of the above should also be included within the scope of computer-readable media.

Further, upon reaching various computer system components, program code may be in the form of computer-executable instructions or data structures that can be transferred automatically from transmission media to computer storage media (devices) (or vice versa). For example, computer-executable instructions or data structures received over a network 106 or data link may be buffered in RAM within a network interface module (e.g., a "NIC"), and then eventually transferred to computer system RAM and/or to less volatile computer storage media (devices) at a computer system. RAM may also include solid state drives (e.g., SSDs or PCI-based real-time memory tiered storage, such as provided by FusionIO®). Thus, it should be understood that computer storage media (devices) may be included in computer system components that also (or even primarily) utilize transmission media.

Computer-executable instructions may comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network 106, both perform tasks. In a distributed system environment, program modules may be located in both local and remote memory storage devices.

Further, where appropriate, functions described herein may be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

Illustrated in the figure is a block diagram illustrating an example computing device 200. Computing device 200 may be used to perform various procedures, such as those discussed herein. Computing device 200 can function as a server, a client, or any other computing entity. Computing device 200 can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200, in one embodiment, includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 may include one or more processors or controllers that execute instructions stored in memory device(s) 204 and/or mass storage device(s) 208. Processor(s) 202 may also include various types of computer-readable media, such as cache memory.

Memory device(s) 204 may include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 may include various computer readable media, such as magnetic tapes, magnetic disks, optical disks, solid-state memory (e.g., Flash memory), and so forth. As shown in the figure, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 may include various devices that allow data and/or other information to be input to or retrieved from computing device 200. Example I/O device(s) 210 include digital imaging devices, electromagnetic sensors and emitters, cursor control devices, keyboards, keypads, microphones, monitors or other display devices, speakers, printers, network interface cards, modems, lenses, and the like.

Display device 230 may include any type of device capable of displaying information to one or more users of computing device 200. Examples of display device 580 include a monitor, a touch-screen display, a display terminal, a video projection device, and the like.

Interface(s) 206 may include various interfaces that allow computing device 200 to interact with other systems, devices, or computing environments. Example interface(s) 206 may include any number of different network interfaces 220, such as interfaces to local area networks (LANs), wide area networks (WANs), wireless networks, and the Internet. Other interface(s) may include user interfaces 218 and peripheral device interfaces 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 may allow processor(s) 202, memory device(s) 204, interface(s) 206, mass storage device(s) 208, and I/O device(s) 210 to communicate with one another, as well as other devices or components coupled to bus 212. Bus 212 may represent one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein may be implemented in hardware, or a combination of hardware, software, and/or firmware. For example, one or more application specific integrated circuits (ASICs) or field programmable gate arrays (FPGAs) can be programmed to carry out one or more of the systems and procedures described herein.

Figure 3:
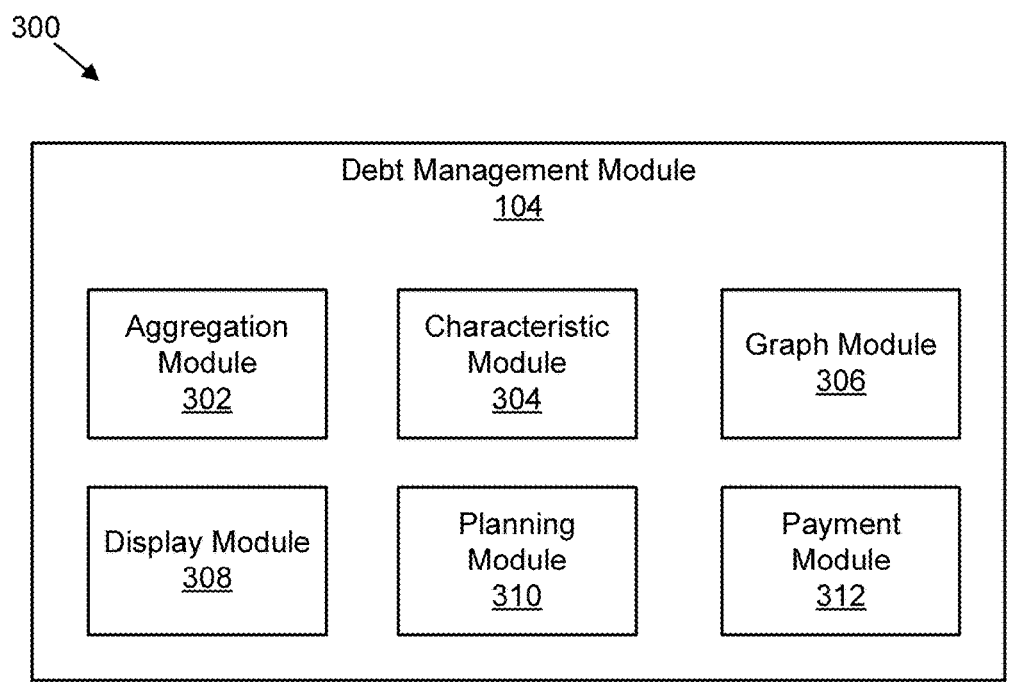
FIG. 3 is a schematic block diagram illustrating one embodiment of a module for transaction-based debt management and visualization.

FIG. 3 depicts an embodiment of a module 300 for transaction-based debt management and visualization. In one embodiment, the module 300 includes an embodiment of a debt management module 104. The debt management module 104 may include one or more of an aggregation module 302, a characteristic module 304, a graph module 306, a display module 308, a planning module 310, and a payment module 312, which are described in more detail below.

The aggregation module 302, in one embodiment, is configured to receive financial data for a user over a data network 106. The financial data may include transaction data, account data, debt data, loan data, budgets, goals, and/or the like. In some embodiments, the financial data is received from one or more financial institutions 108 where the user has a user account such as a checking account, a car loan, a brokerage account, and/or the like. In some embodiments, the aggregation module 302 receives financial data from an aggregation system 110, which may provide financial data for each account that the user has a plurality of financial institutions, including debt accounts such as loans, credit cards, and/or the like.

The characteristic module 304, in one embodiment, is configured to calculate or determine one or more characteristics of the debt data. The characteristics may include a status of one or more debt accounts for a time period, a payoff amount for a debt account, a payoff amount for an aggregated debt amount, an estimated debt payoff date, an amount of money saved from paying more than a minimum payment amount each pay period, and/or the like. In some embodiments, the characteristic module 304 determines one or more characteristics for a debt account for a particular time period, such as the last month, the last six months, the last year, and/or the like.

In one embodiment, the graph module 306 is configured to generate a graphical representation of the debt data using the calculated one or more characteristics of the debt data. For example, the graph module 306 may generate a graphical representation of a payoff schedule of a debt account according to a selected debt plan, described below. The graphical representation may include a graphical representation of an aggregation of all debt accounts (e.g., a graph of the user's total debt obligations). The graph module 306 may also generate a graph of one or more selected debt accounts to be graphically presented along with, or in place of, the graphical representation of the aggregation of all debt accounts. The graphical representation, in some embodiments, may include various types of graphs or charts such as line graphs, bar graphs, pie charts, and/or the like. The graphs or charts may be time-based, meaning that the graphs or charts may depict debt trends over a period of time.

In one embodiment, the display module 308 is configured to graphically present the graphical representation of the debt data within an interface on a display device 230. The interface may include a web page, a mobile application, a desktop application, and/or the like. The display device 230, in one embodiment, may include a touch-enabled display device (e.g., a touch screen) and may be integrated with or otherwise electrically coupled to an information handling device 102, such as a mobile device.

In some embodiments, the display module 308 updates the graphical representation in real-time in response to a user changing one or more factors associated with the characteristics. For example, a graph of a payoff schedule for a loan may be changed in real-time in response to a user modifying the amount paid per month. Thus, if the user increases a monthly payment from $100 to $200, in essence increasing the principal payment by $100, the payoff graph for the particular debt account and/or the payoff graph for the aggregate debt amount, may be updated to reflect the increase in the payment, which would decrease the amount of time required to payoff the current debt amount.

In one embodiment, the planning module 310 is configured to create one or more debt plans for reducing a balance in the one or more of the user's debt accounts. Various debt plans may include different payoff strategies such as paying off the fastest debt first, paying off the debt with the highest interest rate first, paying off the debt with the lowest or highest balance first, paying off debt by a certain date, and/or the like.

The debt plan may include different recommendations, results, strategies, and/or the like for paying extra towards a debt account each pay period. The planning module 310 may base its plans, recommendations, suggestions, and/or the like based on other financial data associated with a user. For example, the planning module 310 may have access to the user's financial data that includes monthly income, monthly expenditures, and/or the like aggregated across various accounts located at different financial institutions 108. Based on the other financial data, the planning module 310 may create a debt payoff plan, a debt reduction plan, one or more recommendations, and/or the like.

In one embodiment, the planning module 310 presents the one or more debt plans to a user in a graphical interface. In one embodiment, the planning module 310 presents the one or more debt plans as part of the graphical representation of the debt data. Accordingly, when a user selects a debt plan, the graph module 306 may generate a new graphical representation of the debt data, and the display module 308 may update the graphical representation of the debt data in real-time to reflect the payoff of the debt data according to the selected debt plan.

In one embodiment, the planning module 310 presents one or more recommendations or suggestions for switching one or more debt accounts to a different financial institution. For example, the planning module 310 may recommend that the user switch his auto loan from his current bank to a different bank that is offering a lower interest rate. In one embodiment, the one or more recommendations are associated with a selected debt plan for reducing the balance in one or more of the user's debt accounts. For example, if the user selects a debt plan for paying off the highest balance debt first—a credit card, for example—the planning module 310 may present an offer from a different bank to transfer his credit card balance to the bank and receive an interest free offer for 12 months, which may reduce the amount of the debt over time.

In one embodiment, the payment module 312 is configured to initiate a wireless payment at a point of sale device using one or more sensors of an information handling device 102. For example, the payment module 312 may initiate a wireless payment using a near-field communication ("NFC") sensor, a magnetic secure transmission ("MST") sensor, an infrared sensor, a proximity sensor, and/or the like, which may be integrated into a mobile device like a smart phone.

In such an embodiment, the payment module 312 may use the one or more sensors to transmit payment information associated with the user to pay for a purchase at a point of sale device of a retailer. For example, the payment module 312 may transmit credit card information, bank account information, and/or the like to process the payment. The payment module 312, however, may refuse processing the payment if it is determined that completing the transaction will cause the user to exceed or increase an amount in a debt account beyond the user's selected data plan. For example, if the selected data plan provides that the user should have $300 or less left on his credit card at the end of the month, and the purchase would cause the amount on the credit card to exceed the $300 goal, then the payment module 312 may refuse processing the payment. The payment module 312 may also provide an alert or notification to the user as to the status of the user's debt account, the user's debt goal, and the reasons why the payment module 312 refused the transaction.

In some embodiments, a user may select a different debt plan on the fly, which may trigger the graph module 306 to generate a new graphical representation of the debt data and the display module 308 to update the displayed graphical representation in real-time. Furthermore, in such an embodiment, the payment module 312, based on the new debt plan, may allow the wireless transaction to process if the transaction does not increase an amount in a debt plan beyond the user's newly selected debt plan.

Figure 4:
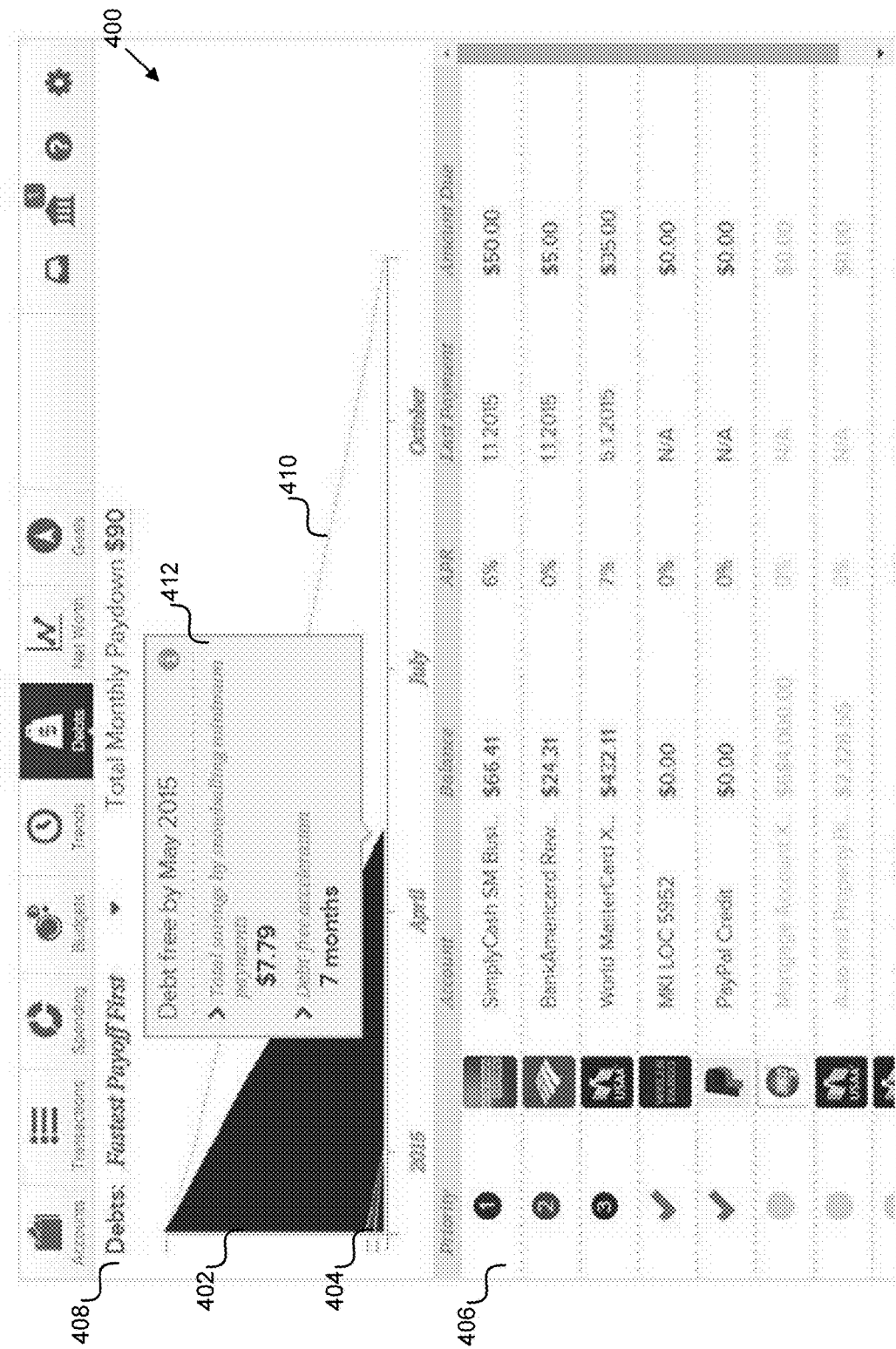
FIG. 4 depicts an embodiment of an interface for transaction-based debt management and visualization.

FIG. 4 depicts an embodiment of an interface 400 for transaction-based debt management and visualization. In one embodiment, the graph module 306 may generate a graphical representation of the user's debt data and the display module 308 may present the graphical representation on the interface 400. The display module 308 may present a graph 402 of the user's total debt burden. The display module 308 may also include a line 410 showing the payoff trend across all the user's debt accounts if the user simply pays a minimum payment according to a standard payment plan. The display module 308 may also show when the user's debt account will be paid off if the user pays extra or accelerates payment on a debt account.

The display module 308, in some embodiments, presents one or more graphical representations 404 of individual debt accounts 406. The individual debt accounts 406 may be selected or unselected by a user for display by the display module 308. Thus, the display module 308 may present a graphical representation of a payoff schedule 404 for each individual debt account 406 that the user selects.

Furthermore, the display module 308 may present one or more debt plans 408 that the planning module 310 creates. As described above the, debt plans may include a fastest payoff first plan, a highest or lowest balance first plan, and/or the like. In response to a user selecting a debt plan, the graph module 306 may generate a graphical representation of the debt data based on the selected debt plan and the display module 308 may update the display of the graphical representation of the data in real time.

The display module 308, in one embodiment, presents status information 412 for one or more debt accounts and/or the aggregated debt amount. The display module 308 may present the status information in a pop-up window, or a similar graphical element, in response to a user clicking, hovering, tapping, swiping, and/or the like a graphical representation of the debt data, which increases the usability of the interface 400 and the interactivity of the user with the interface 400.

According to the selected debt plan, the payment module 312 determines whether to allow or refuse a wireless payment made with a user's mobile device at a point of sale device. For example, if a user attempts to pay with a digital credit card using a mobile device, the payment module 312 may refuse processing the payment if the payment amount would cause the user to not meet the user's payoff goal by increasing a balance in a debt account beyond an acceptable level.

Figure 5:
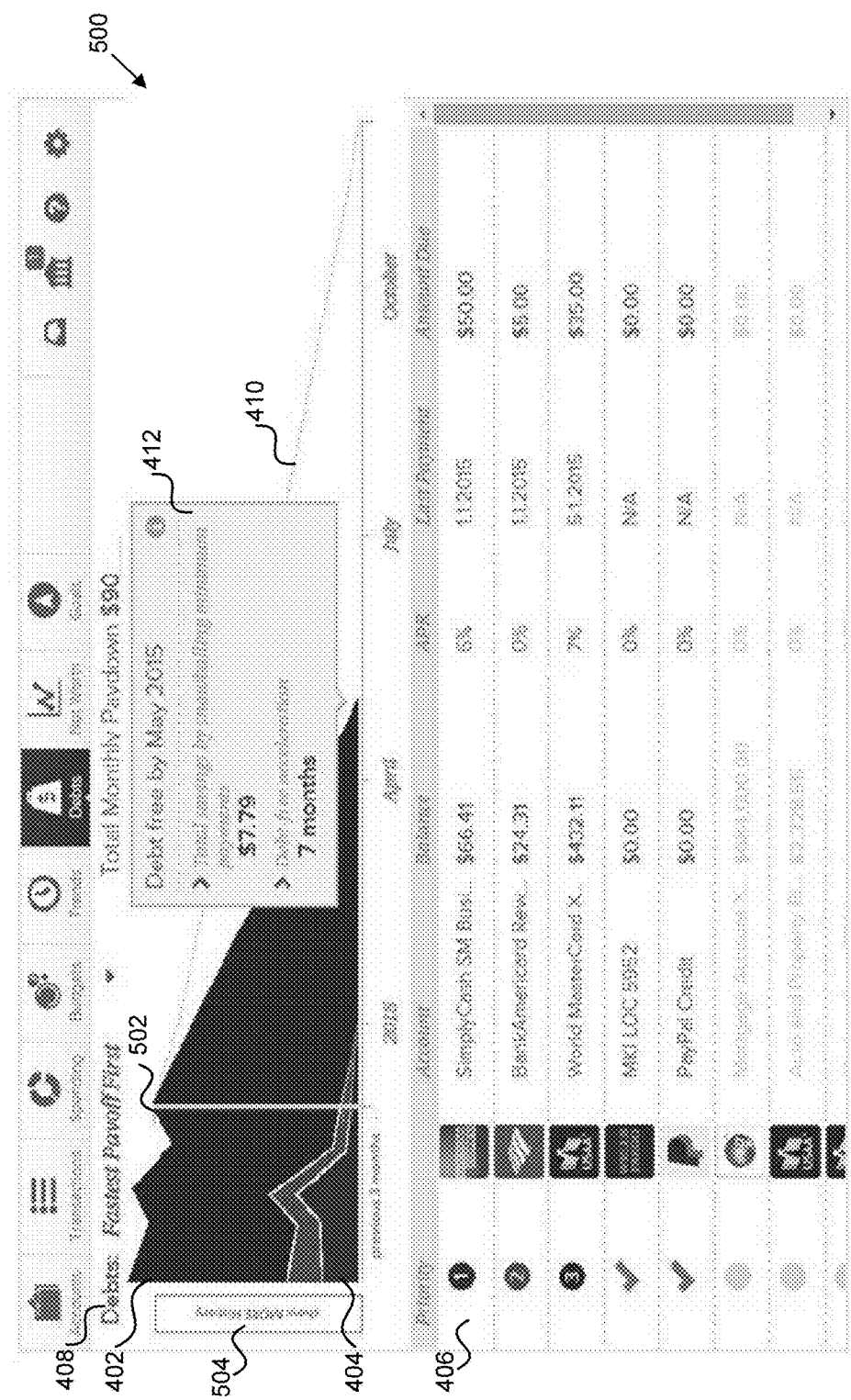
FIG. 5 depicts an embodiment of an interface for transaction-based debt management and visualization.

FIG. 5 depicts an embodiment of an interface 500 for transaction-based debt management and visualization. The interface 500 of FIG. 5 may be substantially similar to the interface 400 depicted in FIG. 4. In addition, the graph module 306 may include historical debt data 502 in the graphical representation of the debt data, which the display module 308 displays for a selected period of time. For example, the previous month, three months, year, and/or the like. Furthermore, the display module 308 may present a button 504, or the like, which a user can click to see additional historical debt data for the aggregated debt amount 402 and also each individual debt account 404. Accordingly, this increases the usability of the interface by providing means for a user to see debt payoff trends over time so that the user can determine which debt plans, budgeting goals, and/or the like are most effective for the user.

Figure 6:
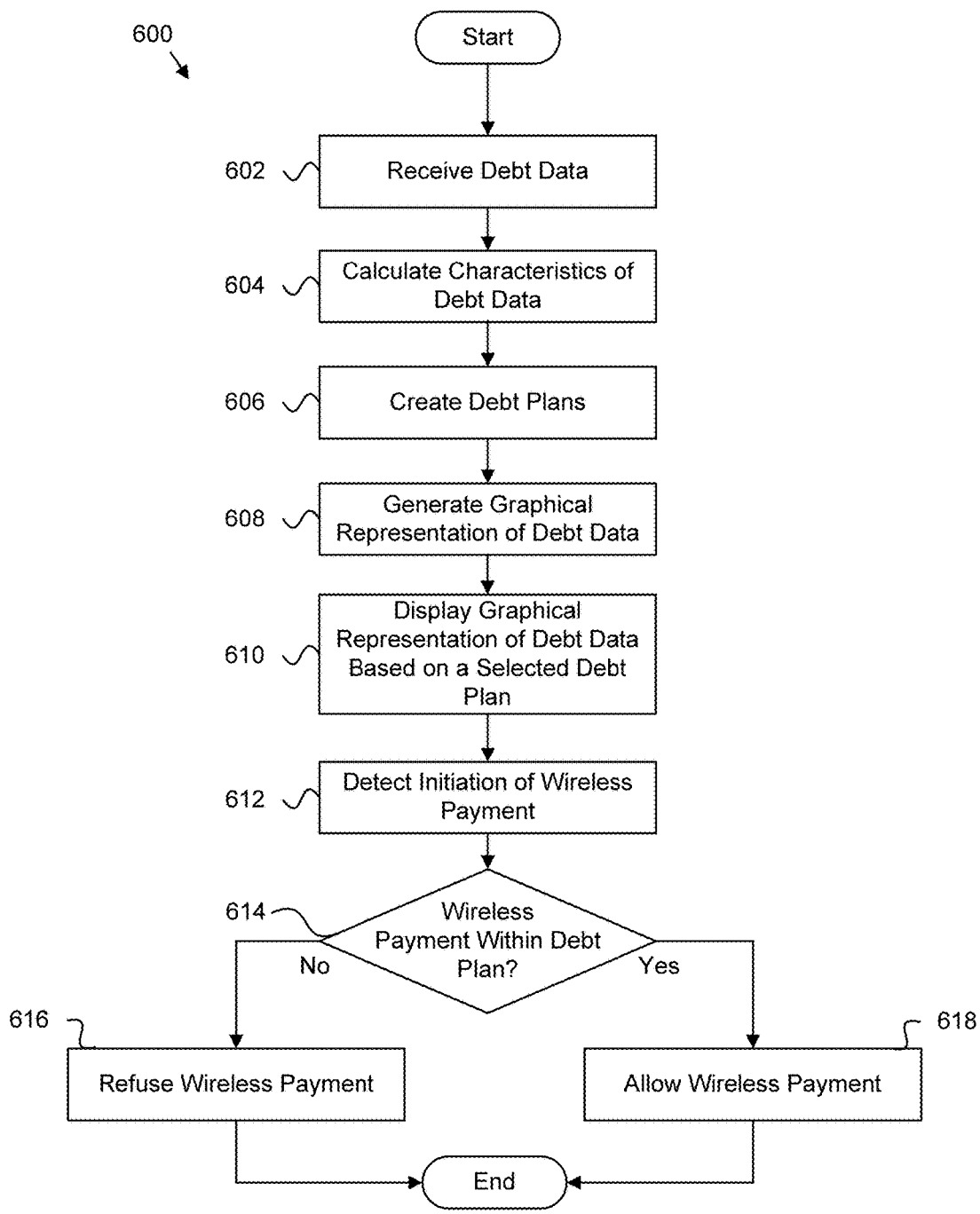
FIG. 6 is a schematic flow chart diagram illustrating one embodiment of a method for transaction-based debt management and visualization.

FIG. 6 depicts a schematic flow chart diagram of one embodiment of a method 600 transaction-based debt management and visualization. In one embodiment, the method 600 begins and the aggregation module 302 receives 602 financial data for a user over a data network 106. The financial data may be received from one or more financial institutions where the user has a user account and may include debt data for one or more debt accounts for the user.

In one embodiment, the characteristic module 304 calculates 604 one or more characteristics of the debt data, such as a debt payoff amount, a debt payoff date, an accelerated debt payoff data, an amount of money save by an accelerated payoff schedule, and/or the like. In some embodiments, the planning module 310 creates 606 one or more debt payment plans for the user, such as a plan for paying off a total debt amount the fastest, a plan for paying off the loan with the highest interest payment first, and/or the like.

Based on the calculated characteristics, the graph module 306 generates 608 a graphical representation of the debt data, and the display module 308 presents 610 the graphical representation of the data on a display of a device. In some embodiments, the display module 308 displays 610 the graphical representation of the data based on a debt plan that the user selects. In certain embodiments, the display module 308 updates the display of the graphical representation of the debt data in real-time in response to a user selecting a debt plan.

In a further embodiment, the payment module 312 detects 612 initiation of a wireless payment. For example, the payment module 312 may detect 612 communication between one or more sensors of a mobile device and one or more sensors of a point of sale device. In some embodiments, the payment module 312 determines 614 whether the wireless payment is within a debt plan that the user has selected, meaning that the payment will not cause a debt account to be greater than an amount specified by the debt plan. If so, then the payment module 312 may allow 618 processing of the wireless payment, and the method 600 ends. If not, the payment module 312 may refuse 616 processing of the payment in order to keep the user on track according to his selected debt plan, and the method 600 ends.

Figure 7:
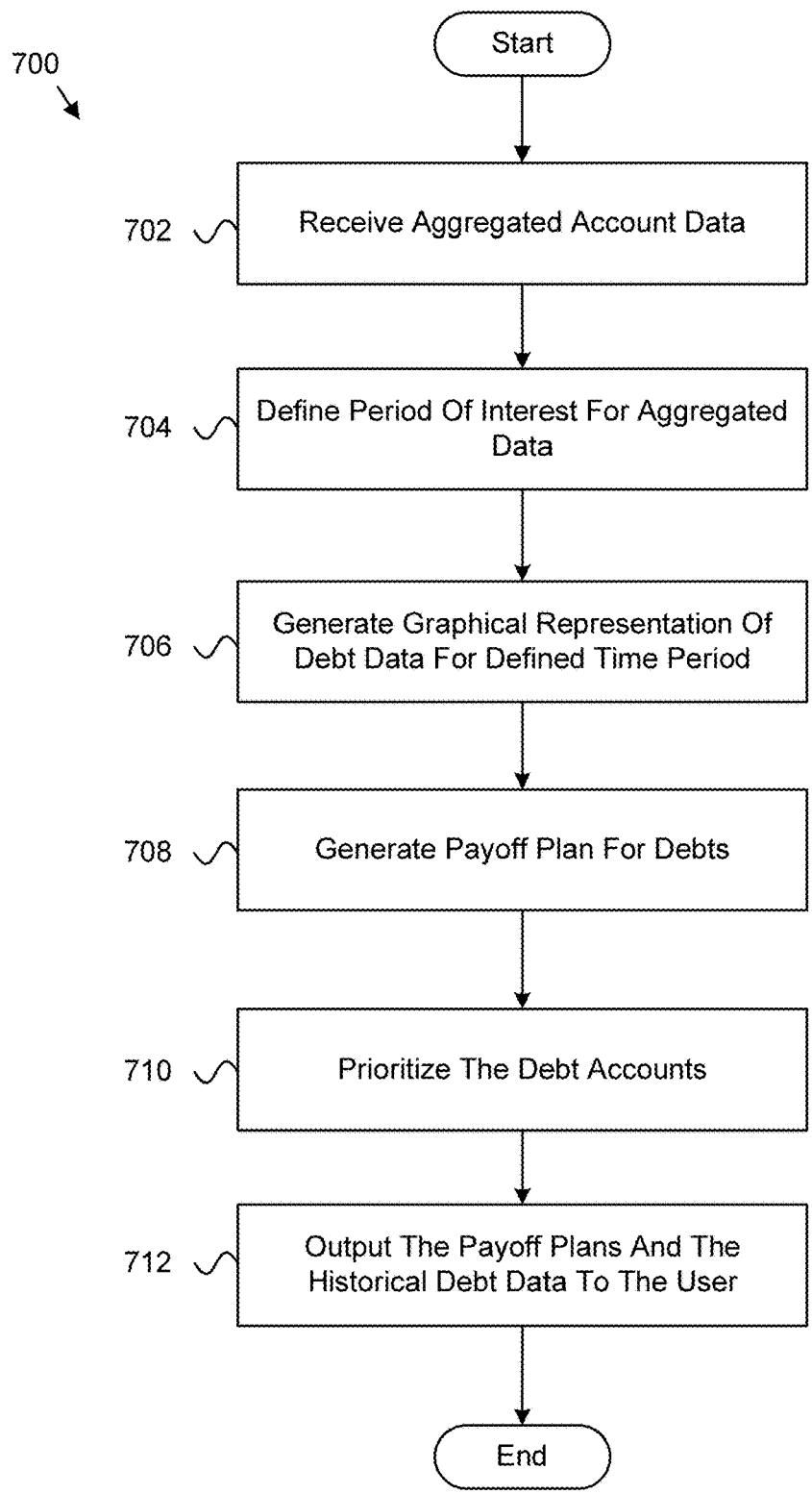
FIG. 7 is a schematic flow chart diagram illustrating one embodiment of another method for transaction-based debt management and visualization.

FIG. 7 depicts a schematic flow chart diagram illustrating one embodiment of a method 700 for transaction-based debt management and visualization. In one embodiment, the method 700 begins, and the aggregation module 302 receives 702 aggregated financial data, including aggregated debt data, from a plurality of financial institutions. The characteristic module 304 may define 704 a period of interest for the aggregated debt data, which may include a historical time period.

The graph module 306 may generate 706 a graphical representation of the debt data, including the historical debt data, for the define time period. The planning module 310, in one embodiment, generates 708 one or more payoff plans for the debt data, including a payoff plan for the total, aggregated amount of debt, and payoff plans for each individual debt account. In one embodiment, the planning module 312 prioritizes 710 the payment order of debt accounts automatically and/or in response to user input. For example, a user may select to pay off a credit card first before a car loan, or the like. The display module 308, in one embodiment, presents 712 the graphical representation of the debt data, including historical debt data, on a display device 230 based on a selected debt plan and prioritization of the user's debt accounts, and the method 700 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a display device; and
    a semiconductor integrated circuit device comprising:
        one or more pins configured to receive debt data for one or more debt accounts of a user;
        one or more hardware circuits configured to calculate one or more characteristics of the debt data, the one or more characteristics being calculated for a period of time related to the debt data;
        one or more hardware circuits configured to create one or more debt plans for reducing a balance in the one or more of the user's debt accounts based on the one or more characteristics of the debt data and one or more non-debt accounts of the user, the one or more debt plans comprising different strategies for paying off the one or more user's debt accounts over time;
        one or more hardware circuits configured to present the one or more debt plans on an interface of the display device, the presented one or more debt plans selectable by a user;
        one or more hardware circuits configured to generate a graphical representation of the debt data for a selected one of the one or more debt plans using the calculated one or more characteristics of the debt data;
        one or more hardware circuits configured to present the graphical representation of the debt data within the interface of the display device;
        one or more hardware circuits configured to dynamically update the graphical representation of the debt data in response to a different one of the one or more debt plans being selected; and
        one or more hardware circuits configured to present the updated graphical representation of the debt data within the interface on the display device.

2. The apparatus of claim 1, wherein the semiconductor integrated circuit device further comprises one or more hardware circuits configured to determine and present one or more recommendations for switching one or more debt accounts to a different financial institution, the one or more recommendations associated with a selected debt plan for reducing the balance in one or more of the user's debt accounts.

3. The apparatus of claim 1, further comprising one or more sensors electrically coupled to the semiconductor integrated circuit device and configured to wirelessly communicate with one or more sensors of a point of sale device.

4. The apparatus of claim 3, wherein the semiconductor integrated circuit device further comprises one or more hardware circuits configured to initiate a wireless payment at a point of sale device using the one or more sensors.

5. The apparatus of claim 4, wherein the semiconductor integrated circuit device further comprises one or more hardware circuits configured to process a wireless payment by wirelessly transmitting payment information to the point of sale device using the one or more sensors.

6. The apparatus of claim 5, wherein the semiconductor integrated circuit device further comprises one or more hardware circuits configured to refuse processing of the wireless payment in response to an amount of the wireless payment increasing an amount in a debt account beyond the user's selected debt plan.

7. The apparatus of claim 1, wherein the semiconductor integrated circuit device further comprises one or more hardware circuits configured to present the graphical representation of the debt data on a time-based graph.

8. The apparatus of claim 7, wherein the semiconductor integrated circuit device further comprises one or more hardware circuits configured to present a graphical representation of a payoff schedule of one or more debt accounts according to a selected debt plan together with the graphical representation of the debt data on the time-based graph.

9. The apparatus of claim 1, wherein the one or more characteristics of the debt data include a status of one or more debt accounts for a time period, a payoff amount for a debt account, a payoff amount for an aggregated debt amount, an estimated debt payoff date, and an amount of money saved from paying more than a minimum payment amount each pay period.

10. The apparatus of claim 1, wherein the semiconductor integrated circuit device further comprises one or more hardware circuits configured to dynamically update the graphical representation of the debt data in real-time in response to a user selecting one or more characteristics associated with the debt data.

11. An apparatus comprising:
a mobile device;
one or more sensors electrically coupled to the mobile device;
the mobile device comprising:
a graph module that generates a graphical representation of debt data associated with a user, the debt data comprising an aggregation of debt data across a plurality of debt accounts of the user;
a planning module that creates one or more debt plans based on one or more characteristics of the debt data and one or more non-debt accounts of the user, the one or more debt plans comprising different strategies for reducing a balance of each of the plurality of debt accounts over time;
a display module that presents the graphical representation of the debt data and the one or more debt plans on a display of the mobile device, the graphical representation of the debt data being presented according to a debt plan selected by the user; and
a payment module that detects initiation of a mobile payment on the mobile device, the mobile payment being initiated using the one or more sensors of the mobile device, the one or more sensors of the mobile device in wireless communication with one or more sensors of a point of sale device and configured to process a mobile payment by wirelessly transmitting payment information from the mobile device to the point of sale device, wherein the payment module refuses processing the mobile payment from at least one of the plurality of debt accounts of the user on the mobile device in response to an amount of the mobile payment increasing a debt amount of the at least one of the plurality of debt accounts beyond the user's selected debt plan.

12. The apparatus of claim 11, wherein the mobile device further comprises an aggregation module that receives financial data for a user over a data network, the financial data being received from one or more financial institutions where the user has a user account, the financial data comprising the debt data for the plurality of debt accounts of the user.

13. The apparatus of claim 11, wherein the mobile device further comprises a characteristic module that calculates one or more characteristics of the debt data, the one or more characteristics being calculated for a period of time related to the debt data.

14. The apparatus of claim 11, wherein the display module presents a graphical representation of a payoff schedule of one or more debt accounts according to a selected debt plan together with the graphical representation of the debt data on a time-based graph.

15. A method comprising:
receiving debt data for one or more debt accounts of a user over a data network at a mobile device;
calculating one or more characteristics of the debt data, the one or more characteristics being calculated for a period of time related to the debt data;
creating one or more debt plans for reducing a balance in the one or more of the user's debt accounts based on the one or more characteristics of the debt data and one or more non-debt accounts of the user, the one or more debt plans comprising different strategies for paying off the one or more user's debt accounts over time;
presenting the one or more debt plans on an interface of the display device, the presented one or more debt plans selectable by a user;
generating a graphical representation of the debt data for a selected one of the one or more debt plans based on one or more characteristics of the debt data determined for a period of time related to the debt data;
presenting the graphical representation of the debt data within the interface of the display device of the mobile device, the display device comprising a touch screen display, the graphical representation of the debt data being interactive on the touch screen display; and
dynamically adjusting the graphical representation of the debt data with a new period of time related to the debt data in response to the user selecting one of a plurality of debt plans for reducing a balance in the one or more of the user's debt accounts, using the touch screen display.

16. The method of claim 15, further comprising detecting a mobile transaction awaiting a wirelessly transmitted payment between one or more sensors of the mobile device and a point of sale device.

17. The method of claim 16, further comprising refusing processing of the mobile payment from at least one of the one or more of the user's debt accounts in response to an amount of the mobile payment increasing an amount in the at least one of the one or more of the user's debt accounts beyond the user's selected one of the plurality of debt plans.

* * * * *